(12) United States Patent
Schulze

(10) Patent No.: US 6,644,112 B2
(45) Date of Patent: Nov. 11, 2003

(54) AIR DATA MEASURING DEVICE AND AIR DATA SYSTEM FOR FLIGHT VEHICLES

(75) Inventor: Bernd Schulze, Taufkirchen (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/300,919

(22) Filed: Nov. 21, 2002

(65) Prior Publication Data

US 2003/0126923 A1 Jul. 10, 2003

(30) Foreign Application Priority Data

Nov. 21, 2001 (DE) .......................... 101 57 074

(51) Int. Cl.[7] .................. A63B 53/00; G01R 13/00; G01W 1/00
(52) U.S. Cl. ................................. 73/170.02
(58) Field of Search .................. 73/170.01, 170.02, 73/170.11, 170.14, 170.15, 861.65, 861.66, 861.67, 861.68, 178 R, 181, 182, 183

(56) References Cited

U.S. PATENT DOCUMENTS

| 3,079,758 A | 3/1963 | Vogel et al. |
| 4,184,149 A | 1/1980 | Baker et al. |
| 5,207,397 A | 5/1993 | Ng et al. |

FOREIGN PATENT DOCUMENTS

| DE | 3634005 | 4/1988 |
| EP | 0632273 | 1/1995 |
| EP | 0647852 | 4/1995 |

*Primary Examiner*—William Oen
(74) *Attorney, Agent, or Firm*—Crowell & Moring LLP

(57) ABSTRACT

Air device for measuring flight conditions for flight vehicles has a probe carrier that is arranged on a structural part of the flight vehicle and is rotationally symmetrical at least at a transition boundary. The probe carrier is rotatable about its longitudinal axis and is disposed on the structural part of the flight vehicle via a bearing, and its mass, is balanced about its longitudinal axis. The angle of rotation of the probe is measurable by way of a measuring sensor. At least two strakes are arranged on the probe symmetrically with respect to the plane of symmetry of the probe, so that the yaw angle $\beta_s$ of the probe is minimized at every oncoming flow condition. At least three pressure measuring bores are provided on the probe surface for detecting differential and absolute pressures via differential pressure sensors assigned to them.

4 Claims, 8 Drawing Sheets

AIR DATA MEASURING DEVICE AND AIR DATA SYSTEM FOR FLIGHT VEHICLES

BACKGROUND AND SUMMARY OF THE INVENTION

This application claims the priority of German patent application 101 57 074.0, filed Nov. 21, 2001, the disclosure of which is expressly incorporated by reference herein.

The invention relates to an air data measuring device and to an air data system for flight vehicles, particularly a device for measuring flight conditions at large airplane angles of incidence.

The measuring device according to the invention and the measuring system according to the invention respectively can be used in the case of flight vehicles of all types, particularly in the case of airplanes and missiles.

Conventional air data systems are operable only in a limited angle of incidence range and are arranged on the airplane such that only the lower angle of incidence range of up to approximately 30° can be detected.

In particular, rigid air data probes arranged for example at the tip of the fuselage and based only on pressure measurements are known, and are provided also for large angles of incidence of up to 90°. However, such probes require extensive and high calibrating expenditures.

It is therefore an object of the invention to provide a suitable probe and a corresponding air data system which permits precise measurement at large angles of incidence and yaw angles, as well as high flying speeds and altitudes, with minimal equipment-related and functional costs.

These and other objects and advantages are achieved by the air data measuring device according to the invention, in which a probe carrier arranged on a structural part is rotationally symmetrical at least at a transition boundary. By means of a bearing, it is rotatably about its longitudinal axis disposed on the structural part, and its mass, is balanced about its longitudinal axis. The angle of rotation ($\phi_S$) of the probe is measurable by way of a measuring sensor, on the probe. At least two strakes are arranged symmetrically to the plane of symmetry of the probe, so that the probe angle of yaw $\beta_S$ of the probe is minimized in the case of each on-coming flow condition. For detection of differential pressures and of an absolute pressure at the probe surface, at least three pressure measuring bores are provided with differential pressure sensors assigned to the latter. Of the pressure measuring bores, the first is situated in the center, or at a radial distance from the center which is smaller than the radial distance from the center of the second pressure measuring bore, while the radial distance of the third bore from the center is equal to or larger than the radial distance of the second pressure measuring bore from the center. One of the pressure measuring bores is situated in the plane of symmetry of the probe and the two other pressure measuring bores are asymmetrical to one another with respect to the plane of symmetry, in order to determine by means of calibrating functions, the air data of the undisturbed flow and check the alignment of the probe.

According to the invention, a symmetrical probe in the shape of a radome tip, which is rotatable about the longitudinal axis of the airplane radome and which has at least one pair of strakes arranged on its circumference, is used as the air data probe. As a result of its aerodynamic influence, the pair of strakes causes a rotating position of the rotatable probe on the airplane. In a sideslip state, a torsion angle $\phi_S$ is thereby created about the radome axis relative to the plane of symmetry of the airplane. By means of the torsion angle $\phi_S$, the probe is situated in a position in which by way of corresponding pressure bores on its surface, a slip-free measuring of its angle of incidence $\alpha_S$ can take place.

According to the invention, on the surface of a rotatable probe, which preferably forms the top of a radome, at least three pressure measuring bores are provided. By means of these bores, for each angle of incidence $\alpha_S$ of the probe, a differential pressure ratio $$R = \left(\frac{p_2 - p_1}{p_1 - p_3}\right)$$

can be determined which is independent of the flight altitude and of the flying speed. By way of calibrations carried out, for example, in a wind tunnel and the determined calibrating function $R=R(\alpha_S)$, the inverted function $\alpha_S=\alpha_S(R)$ is implemented in the air data measuring device or the air data system, such that the angle of incidence of the probe $\alpha S$ can be determined. From the measured actual torsion angle of the probe $\phi_S$ about the longitudinal axis of the radome and the determined angle of incidence of the probe $\alpha_S$, by means of the measured differential pressures and the calibration, an angle of incidence and of yaw $\alpha_F$ and $\beta_F$ respectively can be determined at which the airplane is flying. The detection of the flight altitude and flying speed takes place by means of an absolute-pressure and differential-pressure sensor. To determine the actual absolute static pressure of the undisturbed flow (by means of which the flight altitude is determined), the influence of the flying speed is eliminated by means of the respective differential pressure.

The described system is preferably provided as a supplement to a conventional system, specifically for measuring large angles of incidence. Furthermore, when the air data system according to the invention is operated in combination with a conventional air data system, safety demands can be met in an improved manner by the availability of redundant measurements. However, the system can also be utilized as a sole pressure measuring system in the relevant angle of incidence range.

The invention has the following advantages:

- The arrangement of the probe is situated in the fuselage tip area (or alternatively on a structural part projecting into the flow), so that an undisturbed flow against the probe as well as its radar compatibility is provided. In this case the radome axis or the axis of the structural part can be used as the weathercock axis when, at least in its forward area, the probe forms a rotationally symmetrical body;
- outlays for establishing and implementing the calibrating functions are relatively low because of the aerodynamic alignment of the probe in the flow, since a slip-free measurement of the angle of incidence of the probe takes place and the aerodynamic calibration of the angle of yaw influence is eliminated;
- the calibration of the angle of incidence of the probe takes place by a differential pressure ratio which is independent of the altitude and speed, and is determined on the basis of the measurement of at least two differential pressures by means of at least three pressure measuring bores;
- an increase of the measuring precision of the angle of incidence is permitted in a simple manner by using corresponding differential pressure sensors with a reduced pressure range for the relevant flight range and corresponding bypass lines, without changing the system concept;

the determination of the flight altitude takes place by measuring the absolute pressure at a measuring bore as well as of a differential pressure between two pressure measuring bores at the probe surface, whereby a speed independence of the measuring parameter, thus of the static pressure of the undisturbed oncoming flow, is achieved.

Other objects, advantages and novel features of the present invention will become apparent from the following detailed description of the invention when considered in conjunction with the accompanying drawings.

DETAILED DESCRIPTION OF THE DRAWINGS

Figure 1:
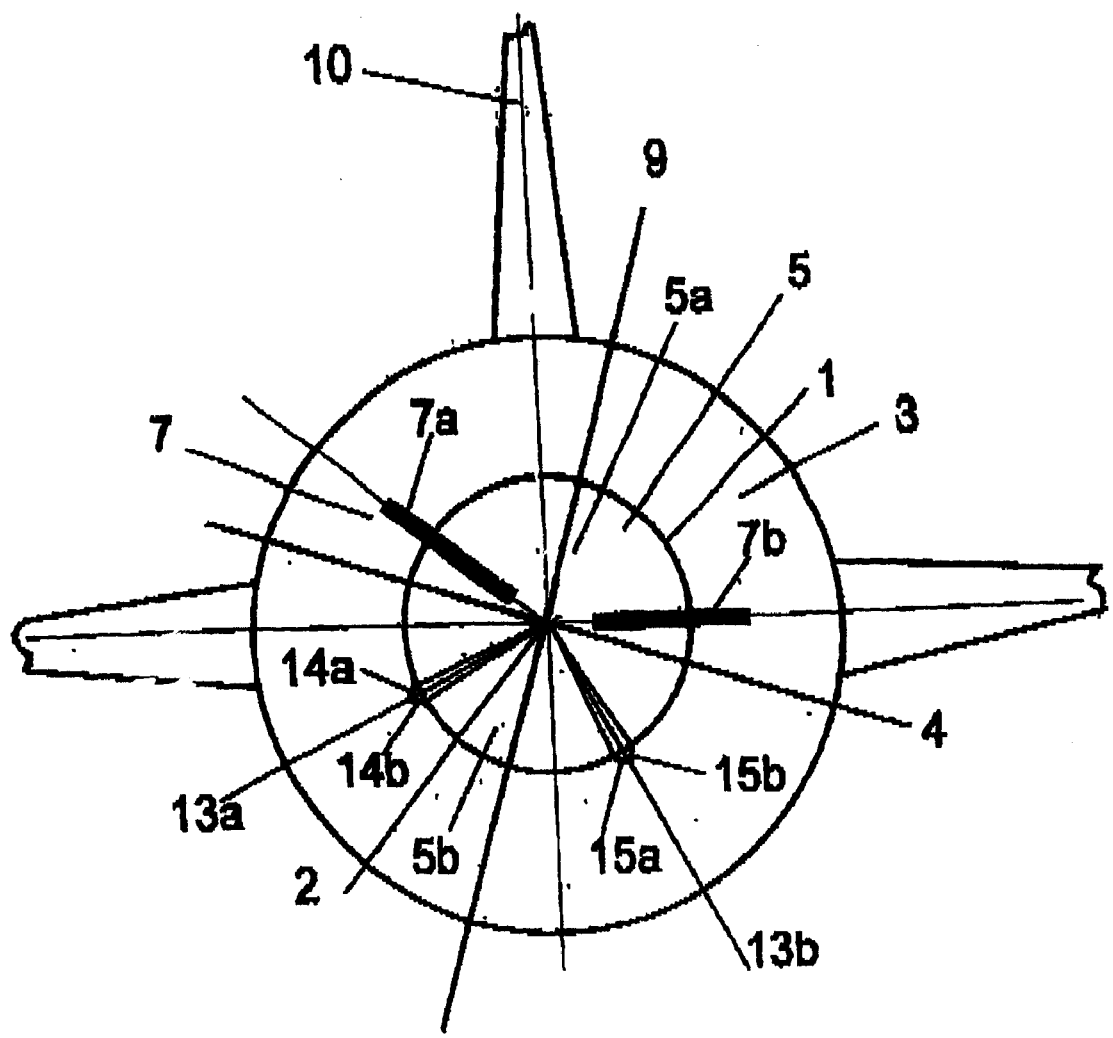
FIG. 1 is a schematic depiction of an embodiment of the air data probe according to the invention viewed from the front, in which the arrangement of the pressure measuring bores is not shown.

The probe 1 according to the invention has a probe carrier 1a which is provided on a suitable (that is, aerodynamically undisturbed) location of the airplane structure or of a structural part 3. The structural part 3 is rotationally symmetrical at least at the transition boundary to the probe carrier 1a. Preferably, the structural part 3 is the forward fuselage segment of an airplane (FIGS. 1 and 2), so that the probe carrier 1a or its probe surface 5 in this case forms a portion of the radome tip of the airplane. The mass of the probe 1 is balanced and, by means of a bearing, it is rotatable about its longitudinal axis 2 arranged largely without friction on the structural part 3. The balancing of masses has the effect that the probe 1 which is not subjected to the oncoming flow is balanced in any rotating position.

Figure 2:
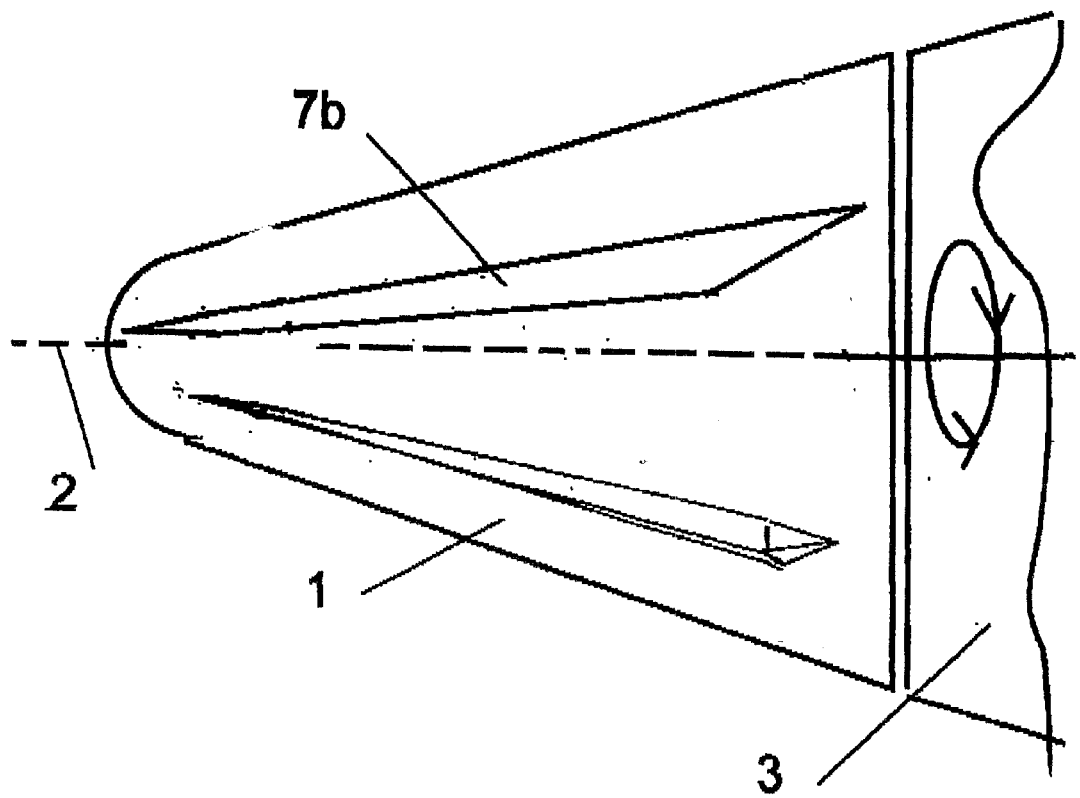
FIG. 2 is a lateral schematic representation of the embodiment of FIG. 1 with a portion of the forward fuselage segment of an airplane viewed from the side.

For a further description, FIG. 1 indicates a reference plane 4 by means of which upper and lower probe halves 5a and 5b are defined. An even number of strakes 7 and particularly two strakes 7a and 7b are preferably arranged on the probe carrier 1a or. In principle, any number of strakes (including a single strake) may be provided. When only one strake is used, the latter is arranged on the plane of symmetry 9. The strakes 7 or 7a, 7b are mounted symmetrically to the plane of symmetry 9 of the probe carrier 1a which extends perpendicular to the reference plane 4. As a result of the strakes 7a and 7b, when the probe 1 is subjected to the oncoming flow, it takes up an equilibrium position as a function of the oncoming flow direction, the oncoming flow angle as of the probe being situated in the plane of symmetry 9. For explaining an assumed flow condition, FIG. 1 shows the oncoming-flow angle $\alpha_S$ of the probe, the angle of incidence $\alpha_F$, the angle of yaw $\beta_F$ as well as the direction of the pertaining probe angle of rotation $\phi_S$. When the probe 1 is rotated, it (and thus also its plane of symmetry 9) is rotated relative to a plane of symmetry 10 of the airplane.

In order to ensure symmetrical flow conditions also when the probe surface is damaged in the case of large angles of incidence of the airplane, preferably an even number of aerodynamic strips or ribs 13 may be symmetrically arranged in the lower probe half 5b, or distributed along the circumference. Preferably two flow ribs or strips 13a, 13b are provided, which extend symmetrically with respect to the plane of symmetry 9. The first flow rib 13a has a first flank 14a and a second flank 14b, and the second flow rib 13b has a first flank 15a and a second flank 15b. However, the ribs may also meet additional functions, such as generating local flow conditions at the probe 1 which yield desired pressures conditions as the pressure measuring bores explained in the following. In comparison to a smooth probe surface, a larger pressure difference is achieved as a result of the strips, whereby the measuring signals assume greater values. This results in a better resolution and an increased precision of the measured values.

Because of the aerodynamic forces acting at the strakes 7 and 7a, 7b, respectively during a rotation of the probe 1 about its longitudinal axis 2 and because of an occurring airplane angle of yaw, an angle of rotation $\phi_S$ of the probe takes plane relative to the plane 10 of symmetry of the airplane. The angle of rotation $\phi_S$ is measured by means of a conventional measuring sensor (for example, by means of an incremental angle sensor). The strakes 7, 7a, 7b are arranged on the upper probe half 5a. Since an aerodynamically stable adjustment of the probe 1 will occur when the strakes 7 and 7a, 7b respectively are situated on the leeward side of the probe 1, the probe 1 according to the invention is provided for measuring positive angles of incidence.

For detection of differential and absolute pressures, at least three pressure measuring bores, each having an assigned differential-pressure sensors, are provided on the probe surface 5. Of these important three pressure measuring bores, two may be situated asymmetrically with respect to the plane of symmetry 9 of the probe, and at least one pressure measuring bore may be situated at a distance with respect to the plane of symmetry 9 of the probe. For example, in a first alternative illustrated in FIG. 3, two pressure measuring bores may be arranged on the plane of symmetry 9, and the third pressure measuring bore may be arranged at a distance thereto. In another embodiment (not shown), two pressure measuring bores may be arranged at a distance and asymmetrically with respect to the symmetry plane 9, and the third pressure measuring bore may be arranged on the symmetry plane 9.

As a result of the described arrangement of the pressure measuring bores according to the invention, it is ensured that the differential pressure between each pan of the at least three pressure measuring bores cannot diminish to near zero.

A fourth measuring bore can also be arranged on the probe 1 for controlling the probe position, in which case this fourth measuring bore is symmetrically arranged with respect to a measuring bore arranged at a distance from the plane of symmetry 9 of the probe 1.

Figure 3:
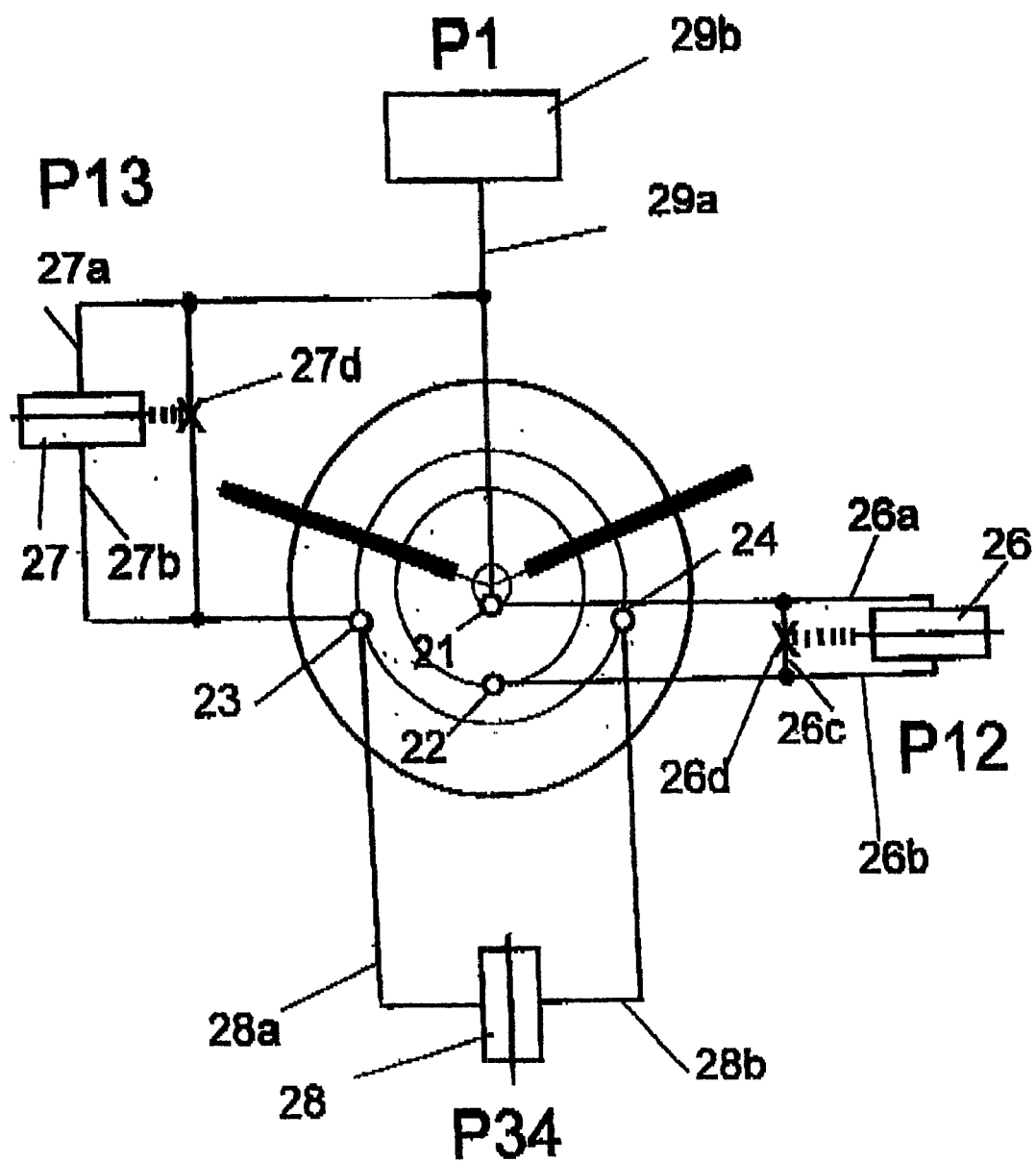
FIG. 3 is a functional representation of a first embodiment of the air data system according to the invention, showing arrangement of the pressure measuring bores as an example, with a wiring diagram for the pressure measurement.

FIG. 3 shows a constellation of four measuring bores 21, 22, 23, 24 which are provided in the probe 1. In this case, a first measuring bore 21 is preferably arranged eccentrically with respect to the tip of the probe 1; a second measuring bore 22 is arranged below the probe 1 on the plane of symmetry 9; and respective third and fourth measuring bores 23,24 are each arranged at a distance from the plane of symmetry 9. In a special embodiment, the first measuring bore 21 may also be arranged at the tip or in the center of the probe 1. The third and fourth measuring bores 23,24 are arranged symmetrically with respect to the plane of symmetry 9 of the probe 1, in order to control or monitor the symmetrical flow onto the probe 1. When such control is not required (that is, measurement of the air data according to the invention is sufficient without any control), the third or fourth measuring bores 23,24 can be eliminated.

In the following, the method of operation of the air data measuring device according to the invention and the air data system according to the invention will be described on the basis of an example of the embodiment according to FIG. 3:

A pressure P1 is applied to the measuring bore 21 when the flow takes plane against the probe 1, and a pressure P2 is applied to the measuring bore 22. A differential pressure transducer 26 connected by way of corresponding pressure pipes 26a, 26b to the measuring bores 21, 22, determines the differential pressure (P1–P2), in the following and in FIG. 3, indicated by means of P12. Likewise, a differential pressure transducer 27 is connected by pressure pipes 27a, 27b between the measuring bores 21 and 23 in order to measure a pressure difference (P1–P3) or P13. A differential pressure transducer 28 is also connected between the measuring bores 33 and 34 via pressure pipes 28a, 28b in order to measure a pressure difference (P3 to P4) or P34.

With the configuration of pressure measuring bores in the embodiment according to FIG. 3, other differential pressure measurements may also be provided (for example, between the measuring bores 22 and 24 or between the measuring bores 21 and 23), either in addition or alternatively.

The differential pressure sensors 26, 27, 28 can be provided for increasing the measuring precision of the angle of incidence (and thus also of the angle of yaw) and have a relatively high sensitivity. As a result, a relatively limited pressure measuring range is obtained, so that the function range of the air data probe 1 is limited to low flying speeds. This corresponds to the partial use of the airplane at large angles of incidence because these can be flown only at limited speeds. For the high-speed range, in which such large differential pressures occur that the differential pressure sensors 26, 27 would be destroyed, the bores 21, 22 and 21, 23 connected with the differential pressure sensors 26, 27 have to be electrically or pneumatically short-circuited by way of corresponding lines 26c, 27c with one pressure valve 26d, 27d respectively.

In operation, a pressure difference exists between measuring bores arranged symmetrically with respect to the plane of symmetry 9. In the embodiment of FIG. 3, the bores 23 are always equal to zero because the rotatable probe 1 is aligned by means of the strakes 7a, 7b into the wind direction plane. Pressure measuring bores arranged symmetrically with respect to the plane of symmetry 9 are therefore not required for a minimal configuration for the determination of the air data, but may be provided for monitoring. If, nevertheless, a differential pressure occurs during the flight between two symmetrically arranged measuring bores, it can be used as an indicator of a failure in the measuring system. This may relate to a system-imminent or an external fault in the measuring system, for example, because of icing or clogging of a measuring bore. In the embodiment of FIG. 3, the measuring bores 23 and 24 or the measuring of the pressure difference (P3–P4) or P34 can be utilized for the fault recognition or for checking the probe position.

By way of another line 29a, an absolute pressure transducer 29b is provided for detecting the absolute pressure at one of the measuring bores, in FIG. 3, at the central measuring bore 21. In principle, the absolute pressure transducer 29b can also be connected to another of the measuring bores 22, 23, 24.

Summarizing, it should be noted that, according to the invention, generally at least two differential pressure measurements and an absolute pressure measurement are required in order to ensure minimal functionality according to the invention. In order to meet safety and control demands, additional measuring bores may be provided. For example, in the embodiment illustrated in FIG. 3, three differential pressure measurements and one absolute pressure measurement are provided so that one differential pressure measurement can be used for monitoring or control purposes.

Figure 4:
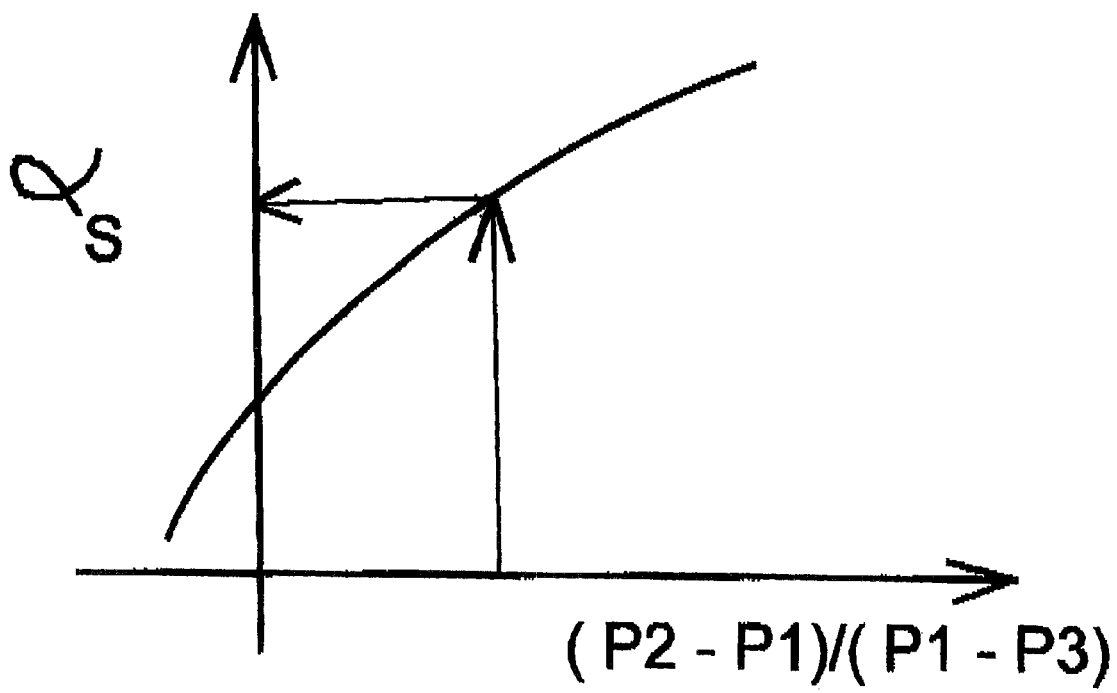
FIG. 4 is a representation of the course of a calibrating function shown as an example for determining the probe angle of incidence $\alpha_S$ as a function of the measured differential-pressure ratio with the pressure measuring bores as indicated in the configuration according to FIG. 3.

As a result of the at least three pressure measuring bores provided for differential pressure measurements, always at least two measured differential pressures (P1–P2) and (P1–P3) are obtained. During flight, an airplane requires information concerning the angle of incidence $\alpha_F$, the angle of yaw $\beta_F$, the flight altitude and the flying speed as the air data, and possibly additional data concerning largely undisturbed air or oncoming flow conditions. For this purpose, the following inverted functions of the calibrating functions in a discrete or other form are implemented in the air data measuring device according to the invention or the air data system according to the invention:

for determination of the probe angle of incidence $\alpha_S$ as a function of measured differential pressure conditions (as an example, in FIG. 4);

for the determination of corresponding coefficients of pressures (as an example, in FIG. 5) present at one pressure measuring bore respectively; and for the determination of coefficients of differential pressures (as an example, in FIG. 6) present at two corresponding pressure measuring bores respectively, each as a function of the probe angle of incidence $\alpha_S$.

Instead of the mentioned functions for the determination of coefficients, other equivalent functions and relationships can also be used, for example, by providing multi-dimensional tables or relations. Generally, the coefficients can be determined by means of tables or numerical fields or analytically by way of functional relationships or by mixed forms. Functions for improving the determination of coefficients may, in addition, be connected with the coefficient functions, for example, functions for support in the event of instabilities or for interpolation.

Figure 5:
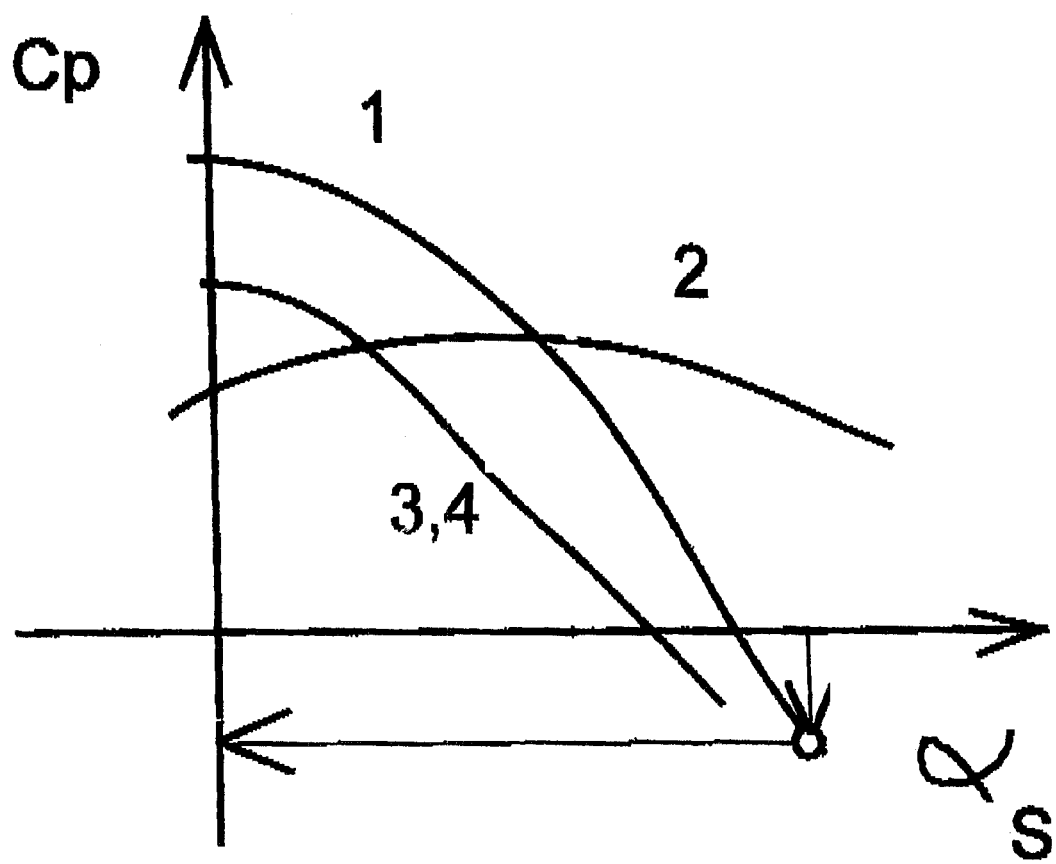
FIG. 5 is a graphic example of calibrating functions for determining the pressure coefficients as a function of the probe angle of incidence $\alpha_S$ for pressures which are measured by means of the pressure measuring bores in the configuration according to FIG. 3.
Figure 6:
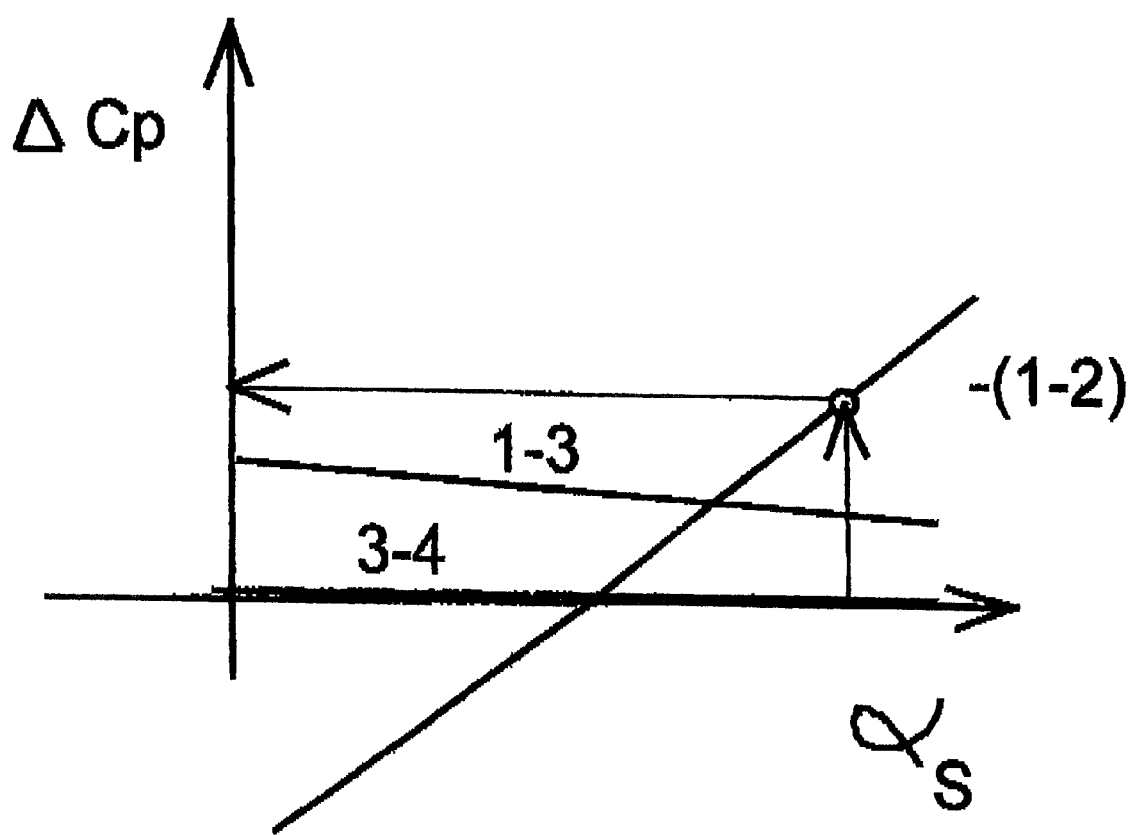
FIG. 6 shows an example of a calibrating function for determining the differential pressure coefficients as a function of the probe angle of incidence $\alpha_S$ for differential pressures which are measured by means of the pressure measuring bores in the configuration according to FIG. 3.

Coefficient functions, in the case of the embodiment of the probe 1 according to FIG. 3, are defined as follows:

$CP1(\alpha_S)=(p1-P_\infty)/Q_\infty$, $\beta_{S=}0$; analogously for CP2 $(\alpha_S)$, CP3 $(\alpha_S)$, CP4 $(\alpha_S)$;

$\Delta Cp1,2(\alpha_S)=\Delta P_{1,2}/Q_\infty, \beta_S=0;$
$\Delta Cp1,3(\alpha_S)=\Delta P_{1,2}/Q_\infty, \beta_S=0;$
$\Delta Cp1,3(\alpha_S)=\Delta P_{1,3}/Q_\infty, \beta_S=0;$
$\Delta Cp3,4(\alpha_S)=\Delta P_{3,4}/Q_\infty, \beta_S=0.$ FIG. 5 shows an example of the courses of the coefficients CP1 ($\alpha_S$), CP2 ($\alpha_S$), CP3 ($\alpha_S$), CP4 ($\alpha_S$) as a function of the probe angle of incidence $\alpha_S$, while FIG. 6 shows an example of the courses of the coefficients $\Delta Cp1,2$ ($\alpha_S$), $\Delta Cp1,3$ ($\alpha_S$), $\Delta Cp3,4$ ($\alpha_S$) as a function of the probe angle of incidence $\alpha_S$.

Figure 7:
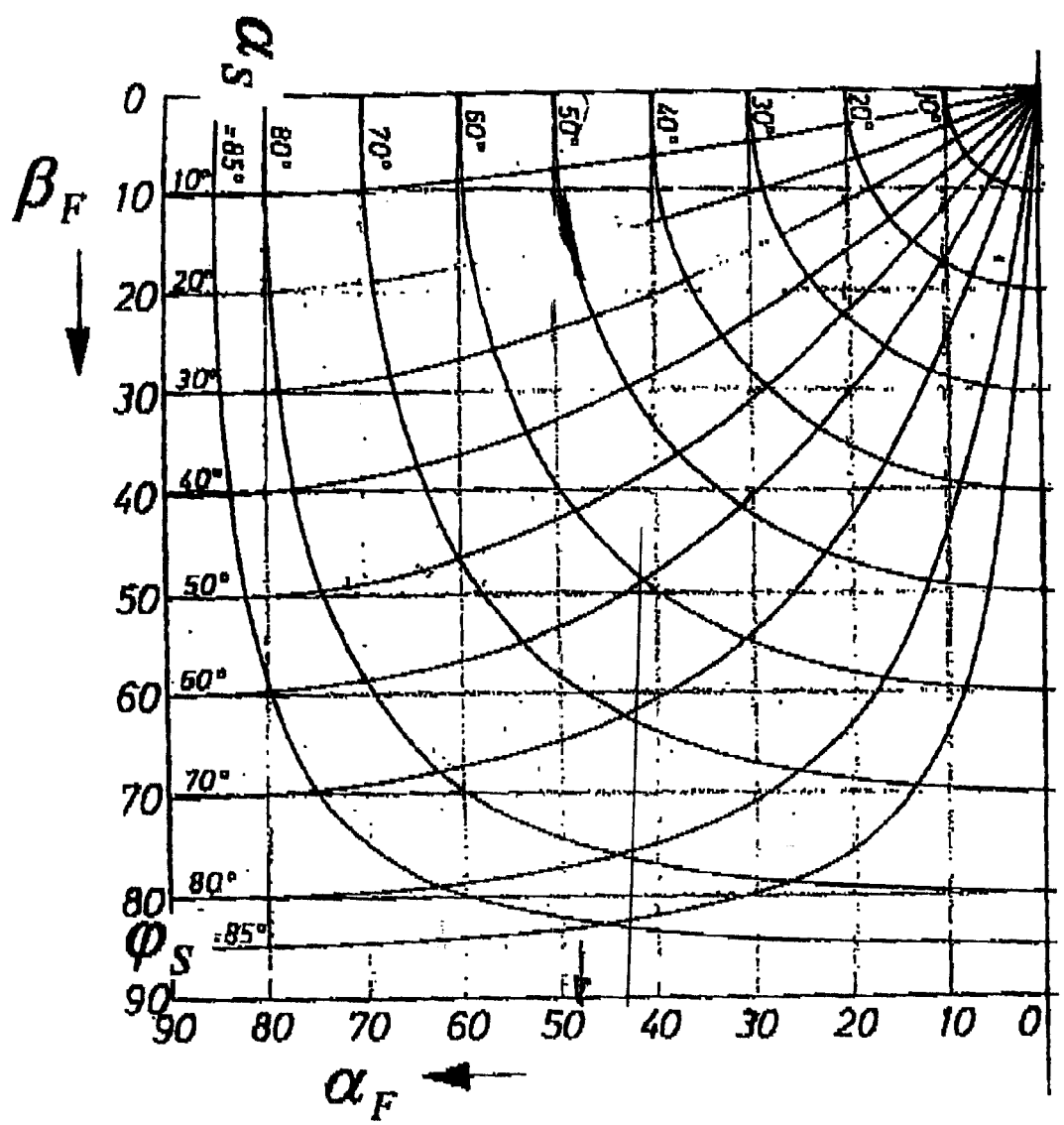
FIG. 7 is a functional representation of the probe angles $\alpha_S$ and $\phi_S$ used as the measured quantities as a function of the angle of incidence and of yaw $\alpha_F$ and $\beta_F$ respectively of the airplane.

As described above, the following takes plane according to the invention:

the dynamic pressure or of the flying speed is determined on the basis of a measured differential pressure ratio, whereby $\alpha_S$ (FIG. 4) is determined, and the corresponding differential pressure coefficient (FIG. 6) is determined therefrom; by means of a formula and the corresponding differential pressure, the dynamic pressure is determined therefrom;

the flight altitude is determined on the basis of a measured differential pressure ratio, whereby $\alpha_S$ (FIG. 4) is determined, and the corresponding differential pressure coefficient (FIG. 5) is determined therefrom; by means of a formula, the existing static pressure of the flight altitude is determined from this pressure coefficient, the respective dynamic pressure and the corresponding absolute pressure present at a pressure measuring bore;

the angle of incidence $\alpha_F$ and the yaw angle $\beta_F$ of the airplane are determined on the basis of a measured differential pressure ratio, whereby $\alpha_S$ (FIG. 4) is determined, and, on the basis of the probe angle of rotation $\phi_S$, by way of trigonometric relationships which are graphically shown as an example in FIG. 7, the airplane angle of incidence $\alpha_F$ and the airplane angle of yaw $\beta_F$ are determined from $\alpha_S$ and $\phi_S$;

additional quantities which can be derived from the above-mentioned air data.

During adjustment of the system before the flight, the calibrating functions are determined largely experimentally (for example, in a wind tunnel or during a flight test). For this purpose, the pressure measuring bores provided according to the invention and the respectively connected pressure transducers are used to establish the calibrating functions of the pressure coefficient Cp, the differential pressure coefficients $\Delta Cp$ and a differential pressure ratio R as a function of the angle of incidence of the probe 1 in the flow. By means of this measuring system, including the implemented inverted functions and the calibrating functions and of the rotatable probe 1, the angle of incidence $\alpha_F$, the angle of yaw $\beta_F$ and the dynamic and static pressure of the flight condition can be determined. Thus, the measuring system represents a high-value air data system for an aircraft at large angles of incidence.

The determination of the dynamic pressure and of the flying speed respectively by way of the measuring quantities, the inverse functions of the calibrating functions and physical formulas takes place as follows:

On the basis of a measured or determined pressure ratio $$R = \cdot \left(\frac{p_2 - p_1}{p_1 - p_3}\right),$$

by way of a corresponding inverse function of the calibrating function R=R($\alpha_S$), the probe angle of incidence $\alpha_S$ (FIG. 4) can be determined, and therefrom the corresponding differential pressure coefficient (FIG. 6). By way of the physical formula for the dynamic pressure of the undisturbed oncoming flow, the following is obtained $$Q_\infty = P12\Delta CP12 \tag{5}$$

The dynamic pressure is determined by means of the measured P12=P1−P2 and the determined $\Delta CP12$ (differences of the pressure coefficients).

The flight altitude is determined as follows by means of the measured quantities, inverse functions of the calibrating functions and physical formulas:

On the basis of a measured differential pressure ratio, the probe angle of incidence as (FIG. 4) and therefrom the corresponding pressure coefficient (FIG. 5) are determined. The static pressure $P_\infty$(that is, the static pressure of the environment), is determined using the measured absolute pressure P1, the dynamic pressure $Q_\infty$ determined at a momentary $\alpha_S$, and the pressure coefficient (for example, of CP1 ($\alpha_S$)) according to the calibrating function illustrated in FIG. 5, for example. Mathematically, this relationship is as follows:

$$P_\infty = P1 - CP1(\alpha_S)^* Q\infty \tag{6}$$

The flight altitude is determined using measured quantities, inverse functions of the calibrating functions and physical formulas, as follows:

During the flight, the probe 1 with its strakes 7a, 7b always adjusts itself sideslip-free with respect to the flight direction, whereby the rotatable probe 1 takes up a finite angle of rotation $\phi_S$ relative to the plane of symmetry 10 of the airplane. In this case, the yaw angle $\beta_S$ of the probe is minimized; that is, its value is negligible, because the probe 1 always aligns itself symmetrically into the wind direction plane. Simultaneously, a specific pressure distribution, which is measurable by way of the differential pressures and the absolute pressure, occurs on the surface of the probe 1. The latter is used to determine the angle of incidence of the probe $\alpha_S$. The differential pressures detected by means of the differential pressure transducers 26 and 27 or 28 are used to form a differential pressure ratio R which is independent of the flying speed and the flight altitude; and, using the inverse function $\alpha_S = \alpha_S$ (R) of a calibrated function R ($\alpha_S$), this permits the determination of the probe angle of incidence $\alpha_S$, wherein $$R = \cdot \left(\frac{p_2 - p_1}{p_1 - p_3}\right)$$

(see Illustration 4)

R is a function of the differential pressure ratio. The differential pressure ratio R permits a determination of $\alpha_S$ independently of the altitude and of the dynamic pressure. In addition, the following relationship applies:

$$\alpha_S = \alpha_S (R) \text{ and } \beta_F = 0 (\phi_S = 0),$$

that is, when the angle of yaw of the airplane $\beta_F$ is equal to zero, the angle of incidence of the probe $\alpha_S$ is equal to the angle of incidence of the airplane $\alpha_F$. The determination of the angle of incidence $\alpha_F$ and of the angle of yaw $\beta_F$ at the sideslipping airplane takes plane by way of trigonometric functions:

$$\alpha_F = \arctan (\tan \alpha_S \cdot \cos \phi_S \tag{3}$$

$$\beta_F = \arcsin (\sin \alpha_S \cdot \sin \phi_S \tag{4}$$

These functions are also implemented in the air data system according to the invention in the form of data sets and/or functions in order to determine the respective actual air data from the measured quantities. The relationship between the angle of rotation $\phi_S$ of the probe and the angle of incidence $\alpha_S$ of the probe, on the one hand, as well as the angle of incidence $\alpha_F$ and the angle of yaw $\beta_F$ of the airplane, on the other hand, is graphically illustrated in FIG. 7. The corresponding relationship is stored in a mathematical form in the case of the air data system according to the invention, so that the angle of incidence $\alpha_F$ and the angle of yaw $\beta_F$ can be directly determined by means of a suitable computer.

The above-mentioned calibrating curves (by means of which, after their inverting from the measured quantities, the air data are derived for the undisturbed flow) are to be determined in tests according to the state of the art. With respect to the angle of rotation of the probe $\phi_S$, no aerodynamic calibration takes place, because this angle of rotation is obtained from the output signal of the high-resolution incremental sensor. The pressures at the probe surface are determined in the wind tunnel in the form of pressure coefficients or differential pressure coefficients only as a function of the probe angle of incidence $\alpha_S$, but not of the angle of yaw.

Additional influences, such as the Mach number in particular, can be included by way of functions known according to the state of the art in the above-described functions.

Figure 8:
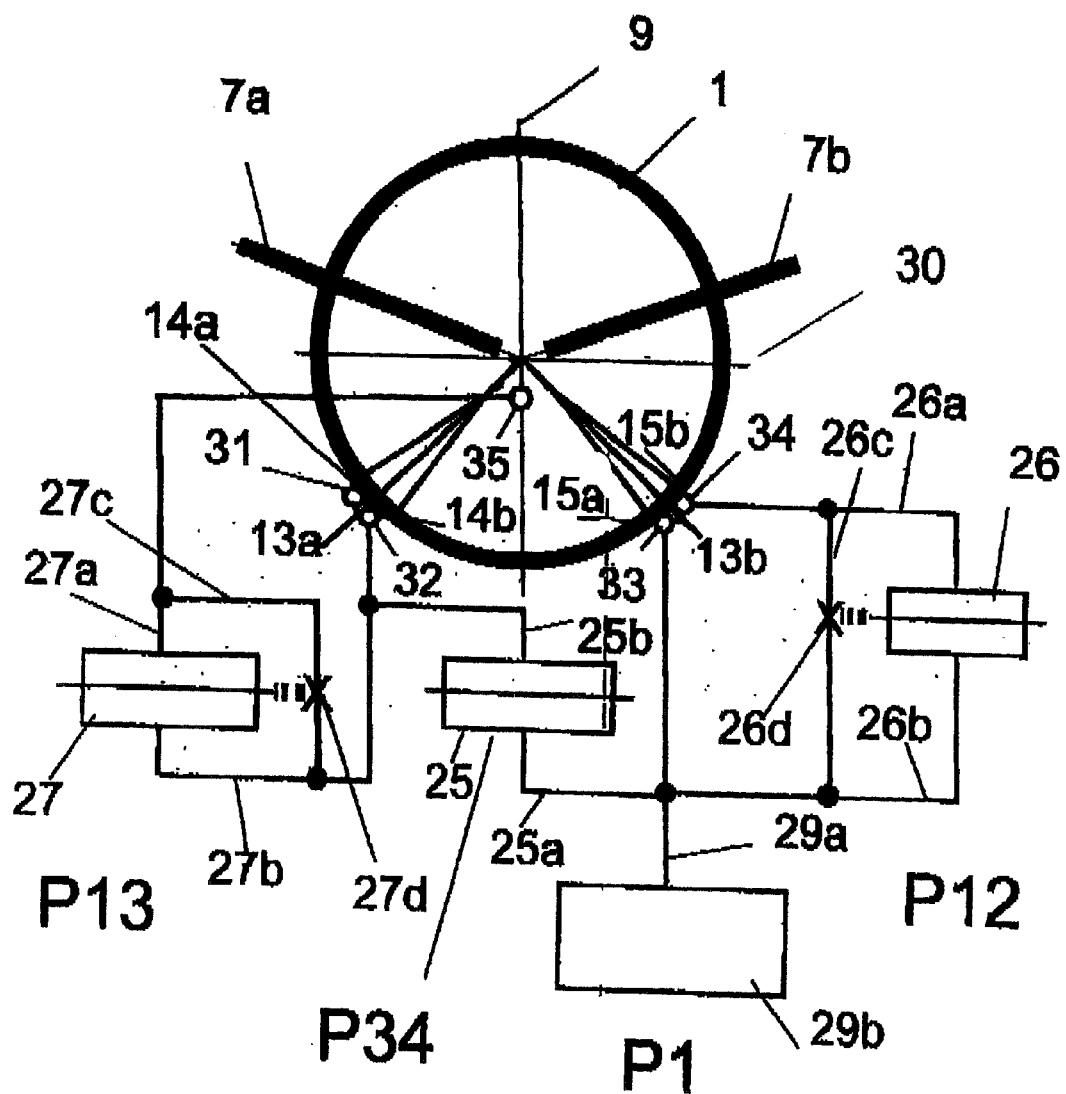
FIG. 8 is a functional representation of a second embodiment of the air data system according to the invention, including an example of the arrangement of pressure measuring bores, together with a wiring diagram for the pressure measurement.

Another embodiment of the probe 1 according to the invention is illustrated in FIG. 8. Two pairs of bores arranged on a flow rib 13a and 13b respectively (for example, bores 31 and 32 or, as an alternative, bores 33 or 34), are used. In both cases, the bore 35 is required, arranged in the central area.

The arrangement of the pressure measuring bores 31, 32, 33, 34 next to the flanks 14a, 14b, 15a, 15b is advantageous with respect to the manufacturing. Pressure measuring bores arranged in such a manner detect disturbances of the flow which are generated by the flow ribs 13a, 13b and are a function of the flight condition.

In the embodiment illustrated in FIG. 8, on the one hand, a first differential pressure is determined using the differential pressure sensor 27, and a second differential pressure is determined using the differential pressure sensor 26. Optionally, the differential pressure sensor 25 may be arranged for controlling the neutral position. The differential pressure sensor 27 is connected by way of pressure pipes, on the one hand, with the pressure measuring bore 36 in the central area of the probe and, on the other hand, with the pressure measuring bore 32 of the first rib 13a. A bypass valve 27d in the corresponding pipes may be provided for safety purposes for the reduction of excess pressures occurring in the differential pressure sensors. Furthermore, the differential pressure sensor 26 is connected by way of pressure pipes, on the one hand, with the pressure measuring bore 33 and, on the other hand, with the pressure measuring bore 34, which are each situated at the second rib 13b. For purposes of safety, a bypass valve 26d in the corresponding pipes may be provided for reduction of excess pressures occurring in the differential pressure sensors. The absolute pressure sensor 29b is connected by way of pressure pipes, with the measuring bores 32 at the first rib 13a and the measuring bore 33 at the second rib 13b. The air data are computed from the pressures detected by means of the pressure sensors, according to the above-described methods of the invention.

In variants of the embodiment according to FIG. 8, always at least two differential pressures are to be formed, in which case the sites for the measuring bores for measuring the respective pressures can be selected according to the demands of the respective application case.

The embodiment with the pressure measuring bores in the area of the ribs has the advantage that flow changes may lead to greater pressure changes at these points than at other points of the probe so that, in the case of a corresponding application, a larger resolution and therefore greater precision can be obtained.

The differential pressures determined according to the invention can also be determined by means of correspondingly combined absolute pressure sensors, instead of the differential pressure sensors. In this case, the differential pressures required according to the invention must be determined from the determined absolute pressures, using corresponding functions.

In order to increase protection against a failure of the air data system according to the invention, several such measuring systems may be provided. As a result, a breakdown or a degradation of a measuring system according to the state of the art can be detected and compensated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air data measuring device for measuring flight conditions for a flight vehicle comprising:

a probe carrier arranged on a structural part of the flight vehicle, said probe carrier being rotationally symmetrical at least at a transition boundary with the flight vehicle, rotatable about its longitudinal axis relative to the structural part by means of a bearing, and having its mass balanced about its longitudinal axis;

a measuring sensor for measuring an angle of rotation of the probe carrier;

a probe mounted on the probe carrier;

at least two strakes arranged on the probe symmetrically with respect to plane of symmetry of the probe, whereby an angle of yaw of the probe is minimized at every oncoming flow condition; and at least three pressure measuring bores with differential pressure sensors assigned to them for detection of differential and absolute pressures on the probe surface; wherein a first pressure measuring bore is situated at the center or at a first radial distance from the center of the probe;

a second pressure measuring bore is situated at a second radial distance from the center of the probe, which second radial distance is greater than the first radial distance;

a radial distance of the third bore from the center of the probe is identical to or larger than the second radial distance;

one of the pressure measuring bores is situated in a plane of symmetry of the probe; and the other two pressure measuring bores are mutually asymmetrical with respect to the plane of symmetry, for determining by means of calibrating functions the air data of an undisturbed flow, and for examining the alignment of the probe.

2. The air data measuring device according to claim 1, wherein two pressure measuring bores are arranged on the plane of symmetry of the probe, and the third pressure measuring bore is arranged at a distance thereto.

3. The air data measuring device according to claim 1, further comprising at least a fourth pressure measuring bore situated symmetrically relative to one of the three additional pressure measuring bores with respect to the plane of symmetry; wherein a pressure difference between the symmetrical pressure measuring bores is used for detecting faults.

4. The air data measuring device according to claim 1, wherein the differential pressure sensors are protected by bypass lines and pressure valves against excessive pressure differences at high speeds and from damage.

* * * * *